(12) United States Patent
Golan et al.

(10) Patent No.: US 11,379,559 B2
(45) Date of Patent: Jul. 5, 2022

(54) AUTOMATIC COPY VALIDATION USING REAL-WORLD APPLICATION TRAFFIC

(71) Applicant: EMC IP Holding Company LLC, Hopkinton, MA (US)

(72) Inventors: Oron Golan, Meitar (IL); Aviram Fireberger, Moshav Mavkiim (IL); Amos Zamir, Beer Sheva (IL); Kfir Wolfson, Beer Sheva (IL); Jehuda Shemer, Kfar Saba (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 170 days.

(21) Appl. No.: 16/031,930

(22) Filed: Jul. 10, 2018

(65) Prior Publication Data

US 2020/0019676 A1 Jan. 16, 2020

(51) Int. Cl.
| | |
|---|---|
| *G06F 21/10* | (2013.01) |
| *H04L 9/40* | (2022.01) |
| *H04L 43/062* | (2022.01) |
| *H04L 43/067* | (2022.01) |
| *H04L 43/04* | (2022.01) |
| *H04L 43/50* | (2022.01) |

(52) U.S. Cl.
CPC .............. *G06F 21/10* (2013.01); *H04L 43/04* (2013.01); *H04L 43/062* (2013.01); *H04L 43/067* (2013.01); *H04L 63/126* (2013.01); *H04L 43/50* (2013.01)

(58) Field of Classification Search
CPC ...................... G06F 21/10; G06F 21/53; G06F 2009/45562; G06F 2201/84; G06F 11/1469; G06F 11/1446; H04L 63/126; H04L 43/062; H04L 43/067; H04L 43/04; H04L 43/50; H04L 67/1095; H04L 41/145
See application file for complete search history.

(56) References Cited

U.S. PATENT DOCUMENTS

| | | | |
|---|---|---|---|
| 7,406,627 B2 * | 7/2008 | Bailey | H04L 41/145 714/38.1 |
| 8,751,450 B1 * | 6/2014 | Gaonkar | H04L 43/10 707/634 |
| 8,839,222 B1 * | 9/2014 | Brandwine | G06F 11/3668 717/168 |
| 8,849,965 B2 * | 9/2014 | Gonia | H04W 24/06 709/220 |
| 8,966,318 B1 * | 2/2015 | Shah | G06F 11/3664 714/41 |
| 9,875,174 B1 * | 1/2018 | Brandwine | G06F 11/3457 |
| 10,084,806 B2 * | 9/2018 | Ward | H04L 63/1433 |

(Continued)

*Primary Examiner* — Robert B Leung
(74) *Attorney, Agent, or Firm* — Workman Nydegger

(57) ABSTRACT

One example method includes bringing up a clone application in a validation environment, replaying recorded incoming network traffic to the clone application, obtaining a response of the clone application to the incoming network traffic, comparing the response of the clone application to recorded outgoing network traffic of the production application, and making a validation determination regarding the clone application, based on the comparison of the response of the clone application to recorded outgoing network traffic of the production application. When the clone application is not validated, the example method includes identifying and resolving a problem relating to the clone application.

20 Claims, 4 Drawing Sheets

(56) References Cited

U.S. PATENT DOCUMENTS

| | | | |
|---|---|---|---|
| 10,866,742 B1* | 12/2020 | Patterson | G06F 3/067 |
| 2006/0101097 A1* | 5/2006 | Barboi | G06F 11/1471 |
| 2007/0180325 A1* | 8/2007 | Bailey | H04L 41/145 |
| | | | 714/38.1 |
| 2009/0319248 A1* | 12/2009 | White | G06F 21/577 |
| | | | 703/13 |
| 2010/0114832 A1* | 5/2010 | Lillibridge | G06F 16/211 |
| | | | 707/649 |
| 2012/0047492 A1* | 2/2012 | Huang | G06F 8/60 |
| | | | 717/128 |
| 2012/0233123 A1* | 9/2012 | Shisheng | G06F 11/004 |
| | | | 707/639 |
| 2013/0055026 A1* | 2/2013 | Hatano | G06F 11/263 |
| | | | 714/32 |
| 2018/0084000 A1* | 3/2018 | Baukes | H04L 61/1511 |
| 2019/0260663 A1* | 8/2019 | Pueblas | H04L 63/1408 |

\* cited by examiner

AUTOMATIC COPY VALIDATION USING REAL-WORLD APPLICATION TRAFFIC

Embodiments of the present invention generally relate to data protection. More particularly, at least some embodiments of the invention relate to systems, hardware, software, computer-readable media, and methods directed to the validation of application copies, and environment copies, for example. Example validation processes may be performed using, or at least based upon, actual data traffic generated in connection with the operation of one or more applications. In at least some instances, the validation process or processes may be performed automatically.

BACKGROUND

Business critical software applications typically have data protection systems installed, such as backup and replication systems, in order to help achieve business continuity and to help assure limited downtime in case of errors or other problems. Some example use cases for the implementation of recovery functionality are operational recovery, in cases such as accidental deletion of application data, and disaster recovery.

Protected applications are typically backed up periodically, or are continuously replicated. Replica copies of an application are typically an image of the production virtual machines (VM) at a given point in time. Specific copies of an application, sometimes referred to as snapshots or bookmarks, are typically put through a validation process to make sure the application copy is intact, and that the application would work properly if restored to the given point in time.

Typical validation processes, however, are limited in terms of their usefulness and effectiveness. For example, the validation of application copies typically consists of the performance of simple connectivity tests. One problem with such tests is that they are static, in that they do not assure the application will operate correctly, but only check basic information about the application. Another problem with static testing is that it does not test for changes concerning the application, such as changes to the application state, or changes to the application data.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
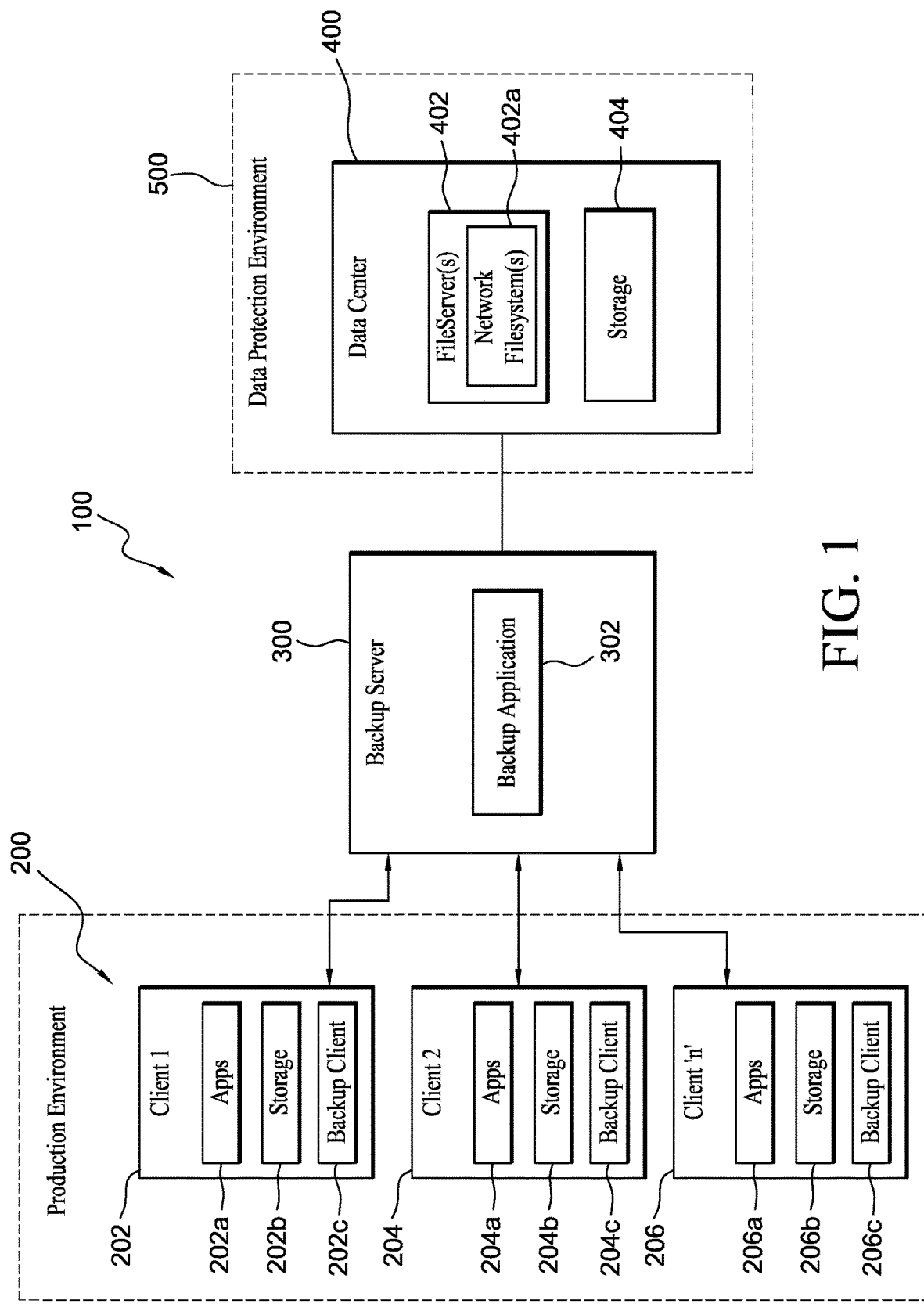
FIG. 1 discloses aspects of an example operating environment for some embodiments of the invention.

Embodiments of the present invention generally relate to data protection. More particularly, at least some embodiments of the invention relate to systems, hardware, software, computer-readable media, and methods directed to the validation of application copies, and environment copies, for example. Example validation processes may be performed using, or at least based upon, actual data traffic generated in connection with the operation of one or more applications. In at least some instances, the validation process or processes may be performed automatically. As well, disclosed validation processes are adaptable to changing conditions, such as changes in the state of an application.

In general, static validation processes are not comprehensive and, as such, may not be good indicators of the health of an application and its processes. For example, an application might be up and running, with the application program interface (API) endpoint and database working, but other internal processes of the application might not be functioning properly, and typical validation processes will not be aware of, nor able to resolve, this problem. Further, simple GET/READ operations employed in conventional validation processes do not test important functions of the application. Moreover, since the application state and data keep changing, the static tests must be kept simple. To illustrate, GET operations may test the basic health of the application processes, based on API replies and a basic table, but those operations will not test the actual data generated by the application. Finally, the limited functionality of static validation tests may cause application developers and data protection system integrators to focus simply on passing the static tests. Thus the important functional aspects of the application may either require manual tests, or testing of those functional aspects will be skipped altogether, thus resulting in a product that might fail in real disaster recovery scenarios.

With these points in mind, some embodiments of the invention employ a network traffic recorder and player, one example of which is the Dell EMC Network Traffic Generator (NTG), in connection with a validation process. It should be noted that that particular traffic recorder/generator is not required, and any other suitable traffic recorder/generator can alternatively be employed. In general, the Dell EMC NTG is a tool that enables construction and use of a mathematical model representing network traffic in production which is later used to simulate and inject network traffic that will represent, in high fidelity, real network traffic. As well, this tool has the ability to replay recorded traffic from a local host to a remote live host and also simulate the original time gap between packets. Embodiments of the invention may be especially well suited for use with services, that is, applications, with deterministic behavior, specifically, applications which expose a Representational State Transfer (REST) RESTful API. However, the scope of the invention is not limited to these types of applications and, instead, extends more broadly to any clone application that is desired to be evaluated.

The network traffic generator may be employed in connection with a clone. That is, an environment and/or application may be cloned so as to later serve as a recovery point, in the event that a problem occurs with the environment or application from which the clone was made. Validation of the clone is necessary to ensure that, if the application is restored to the point in time associated with the clone, the clone will operate correctly. In some instances, the clone takes the form of a snapshot of an application, but no particular form of a clone is required. As used herein, cloning embraces processes including, but not limited to, copying, replication, mirroring, backup/restore processes, or any other mechanism that produces an identical version of the production application and/or production environment for testing. The clone can be on the same location as the production or at a different location.

In order to validate the clone, incoming traffic from the production application is recorded and then replayed on the clone. The clone application outgoing traffic is then recorded and compared with the traffic that was previously recorded from the production application. If the clone application and the production application both produce the same replies to the same real-world request, then the clone application can be declared as validated. This is because, for many applications, it may be expected that the production application and the clone application will behave similarly, given the same input request. As disclosed herein, the production application and the clone application may not behave in exactly the same way. Because the initial recorded traffic timestamps and the clone application timestamps can be synchronized, a deterministic start and end point can be established with each validation test iteration. If a problem later occurs with the production application, there is assurance that the recovery point clone will operate correctly. It should be noted that in some instances, such as when a problem is experienced with the production application, a validated clone application can step into the role of the production application.

Advantageously then, embodiments of the invention enable real-world testing of an application. Particularly, evaluation of the clone performance may enable identification of problems with an application that can then be corrected by a developer before the application is employed in a production environment. As well, testing of clones, such as clone applications, can be performed in order to determine whether or not the clone will operate correctly. If the clone does not operate correctly, that information can be used as a basis for investigating and resolving any problems with the cloning process and/or with the clone application itself. Moreover, because embodiments of the validation process use actual network traffic generated by the operation of an application, the validation process can identify problems with the clone application that would not be identified by static validation processes. As well, embodiments of the validation process can be performed automatically, on an ad-hoc basis, or according to a predetermined schedule. In this way, validation may be performed on an ongoing basis. Finally, embodiments of the invention may eliminate the need to write and execute manual tests for testing the operation of a clone application.

As the foregoing examples illustrate, embodiments of the invention may improve the operation of a computing system, or element of a computing system, and/or may facilitate resolution of one or more technological problems relating to testing, operation, and/or problem diagnosis and resolution, in computing systems, elements, and methods. Aspects of the disclosed processes and methods are discussed below in connection with various illustrative examples.

A. Aspects of an Example Operating Environment

The following is a discussion of aspects of example operating environments for various embodiments of the invention. This discussion is not intended to limit the scope of the invention, or the applicability of the embodiments, in any way.

In general, embodiments of the invention may include and/or be implemented in an operating environment that includes a data protection environment, which may include one or more storage systems including primary storage and data protection storage. In some specific example embodiments of the invention, at least some data protection functionality may be provided by, or implemented in connection with, a platform such as the Dell-EMC DataDomain data protection platform, and associated systems, methods, and components, although use of this particular platform is provided only by way of illustration and is not required. More generally, embodiments of the invention may be employed in connection with various other data protection platforms, examples of which include, but are not limited to, any of the products in the Dell EMC DP Suite of data protection products.

The data protection environment may take the form of a cloud storage environment, an on-premises storage environment, and hybrid storage environments that include public and private elements, although the scope of the invention extends to any other type of data protection environment as well. Any of these example data protection environments, may be partly, or completely, virtualized.

In addition to the data protection environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as Microsoft Exchange, database applications such as SQL Server, filesystems, as well as datastores such as Oracle databases for example. The applications on the clients may generate new and/or modified data that is desired to be protected.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes, storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

With particular reference now to FIG. 1, an example operating environment 100 may include a plurality of clients 200, such as clients 202, 204 and 206. Each of the clients 200 may host one or more applications 202*a*, 204*a* and 206*a*, respectively, that create new and/or modified data that is desired to be protected. As such, the clients 200 are examples of host devices. One, some, or all, of the clients 200 may take the form of a VM, although that is not required. In general, the VM is a virtualization of underlying hardware and/or software and, as such, one or more of the clients 200 may include or otherwise be associated with various underlying components.

As well, each of the clients 200 may include respective local storage 202b, 204b and 206b. The local storage 202b, 204b and 206b can be used to store data, which may be backed up as described below. The backup data can be restored to local storage 202b, 204b and 206b. The clients 200 may each also include a respective backup client application 202c, 204c and 206c. As shown in FIG. 1, and discussed in connection with FIG. 2, the clients 200 may collectively form a portion of a Production Environment.

With continued reference to FIG. 1, the example operating environment 100 may further include one or more backup servers, such as a backup server 300 that includes a backup application 302. The backup application 302 may cooperate with one or more of the backup clients 202c, 204c, or 206c to backup client 202, 204 and 206 data and/or applications 202a, 204a, and 206a, at a datacenter 400 of a data protection environment 500. The backup application 302 may also cooperate with one or more of the backup clients 202c, 204c, or 206c to restore backed up client 202, 204 and 206 data from the datacenter 400 to the clients 202, 204 and 206. In some embodiments, the backup server 300 may be an EMC Corp. Avamar server or an EMC Corp. Networker server, although no particular server is required for embodiments of the invention.

The data protection environment 500 may be implemented as a Dell-EMC DataDomain data protection environment, although that is not required. The data protection environment 500 may support various data protection processes, including data replication, cloning, data backup, and data restoration, for example. As indicated, the data protection environment 500, may comprise or consist of datacenter 400, which may be a cloud storage datacenter in some embodiments, that includes one or more network fileservers 402 that are accessible, either directly or indirectly, by the clients 200. Each of the network fileservers 402 can include one or more corresponding network filesystems 402a, and/or portions thereof.

The datacenter 400 may include and/or have access to storage 404, such as a data storage array for example, that communicates with the network filesystems 402a. In general, the storage 404 is configured to store client 200 data backups that can be restored to the clients 200 in the event that a loss of data or other problem occurs with respect to the clients 200. The term data backups is intended to be construed broadly and includes, but is not limited to, partial backups, incremental backups, full backups, clones, snapshots, continuous replication, and any other type of copies of data, and any combination of the foregoing. Any of the foregoing may, or may not, be deduplicated.

The storage 404 can employ, or be backed by, a mix of storage types, such as Solid State Drive (SSD) storage for transactional type workloads such as databases and boot volumes whose performance is typically considered in terms of the number of input/output operations (IOPS) performed. Additionally, or alternatively, the storage 404 can use Hard Disk Drive (HDD) storage for throughput intensive workloads that are typically measured in terms of data transfer rates such as MB/s.

B. Aspects of an Example Validation Environment

Figure 2:
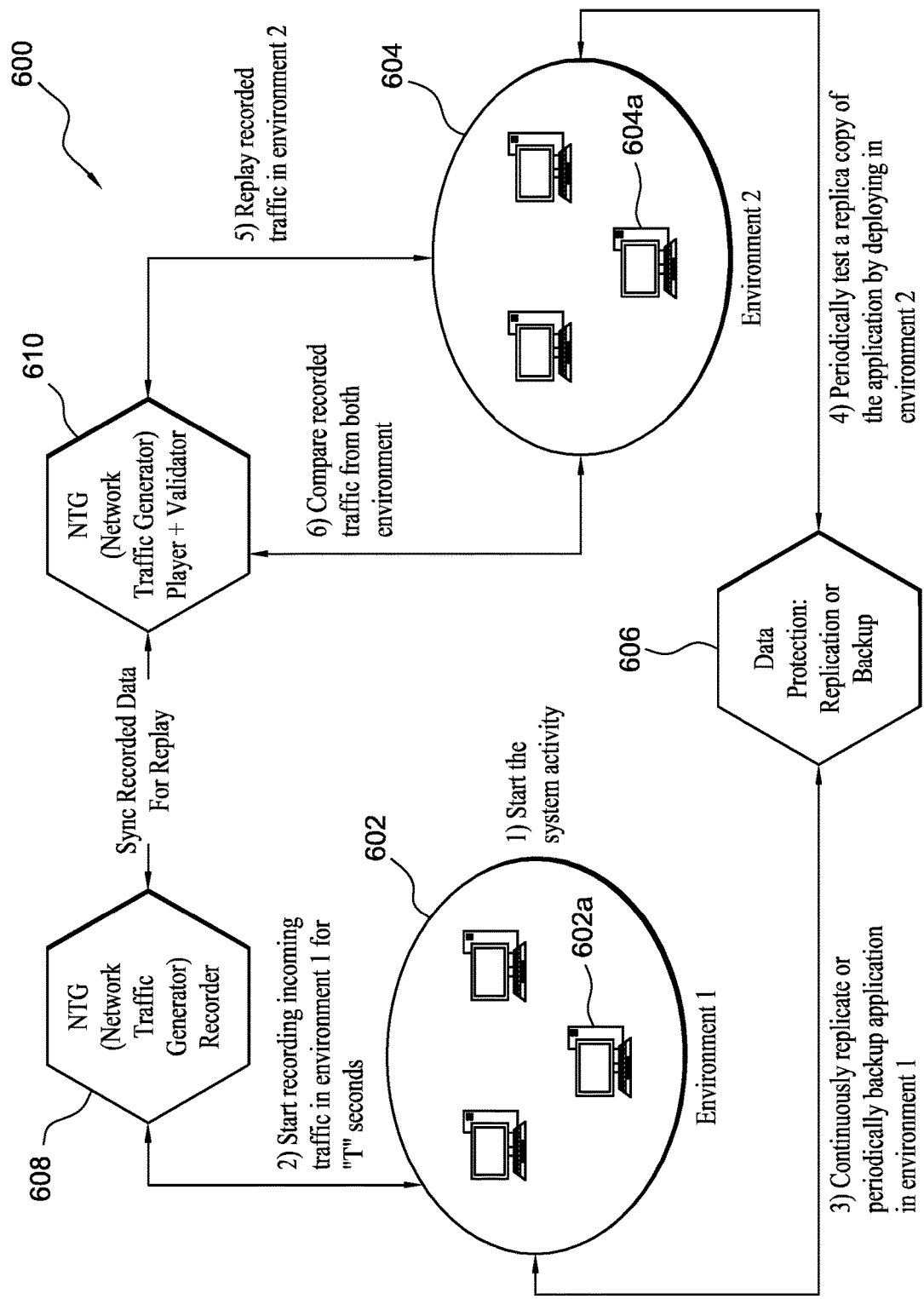
FIG. 2 discloses aspects of example production and validation environments.

With continued attention to FIG. 1, and directing attention now to FIG. 2 as well, details are provided concerning an environment 600 in which validation processes such as those disclosed herein may be performed. Specifically, the environment 600 may include a production environment (see FIG. 2) 602 such as Environment1 and a validation environment 604 such as Environment2. In at least some embodiments, the validation environment 604 may comprise, or consist of, a snapshot of the production environment 602.

As exemplified in FIG. 2, the production environment 602 may include one or more clients 602a, examples of which include the clients 200. While not necessarily required, the validation environment 604 may be configured similarly, or identical, to the production environment 602. As such, the validation environment 604 may include one or more clients 604a that are similar, or identical, to one of the clients 200.

As used herein, a production environment refers to a computing environment, or portion thereof, in which enterprise computing system operations, such as data protection operations for example, are normally performed. A validation environment refers to a computing environment, or portion thereof, that is dedicated to testing and validation processes and procedures. As such, normal enterprise computing system operations are not ordinarily performed in the validation environment.

A data protection environment 606 may be provided that is configured to communicate with one or both of the production environment 602 and the validation environment 604. Details concerning one example of a data protection environment 606 are disclosed in FIG. 1 (see Data Protection Environment 500). The data protection environment 606 may include, or communicate with, a backup server such as the backup server 300.

The example environment 600 further includes a network traffic generator (NTG) recorder 608 configured for communication with the production environment 602, and for communication with an NTG player-validator 610. The NTG recorder 608 and/or the NTG player-validator 610 may be elements of any of: a backup server, such as backup server 300; a data protection environment 606, another example of which is the data protection environment 500; a validation environment 604 or, as shown in FIG. 2, may take the form of respective stand-alone entities.

However, no particular configuration or arrangement of the NTG recorder 608 and the NTG player-validator 610 is required. In still other embodiments, the NTG recorder 608 and the NTG player-validator 610 may reside together as a single entity. The NTG recorder 608 and the NTG player-validator 610 may each take the form of a respective application that resides on a respective host, although this arrangement is likewise not required.

With continued reference to FIG. 2, the following is a brief summary of an example method of the invention. At 1), system activity is begun, that is, an application in the production environment 602 may send and receive network traffic that includes data and metadata. Beginning at 2), incoming and/or outgoing traffic of the production application is recorded, such as by the NTG recorder 608, for a time period "T" which can be any length of time.

At 3), the production application may be continuously replicated, or may be periodically backed up, such as by a backup application for example. In either case, the resulting clone application(s) may be stored in a data protection system 606. At 4), the clone application may be retrieved from storage and periodically tested by deploying the clone application to the validation environment 604. Once the clone application has been so deployed, the recorded traffic may be replayed 5), such as by the NTG player-validator, in the validation environment 604 which, as noted earlier, may take the form of a clone of the production environment 602. During, or after, the recorded traffic has been replayed, the recorded traffic from the validation environment may be compared 6), such as by the NTG player-validator, with recorded traffic from the production environment.

If any inconsistencies or problems are identified, it may be concluded, by the NTG player-validator, that the clone application is not valid, and various remedial actions may have to be taken regarding one or more of the production application, the production environment, the clone application, and/or the validation environment. On the other hand if the recorded traffic from the validation environment is the same as the recorded traffic from the production environment, or otherwise conforms with a validation standard, then it can be concluded that the clone application and the production environment clone are valid.

C. Example Host and Server Configurations

Figure 3:
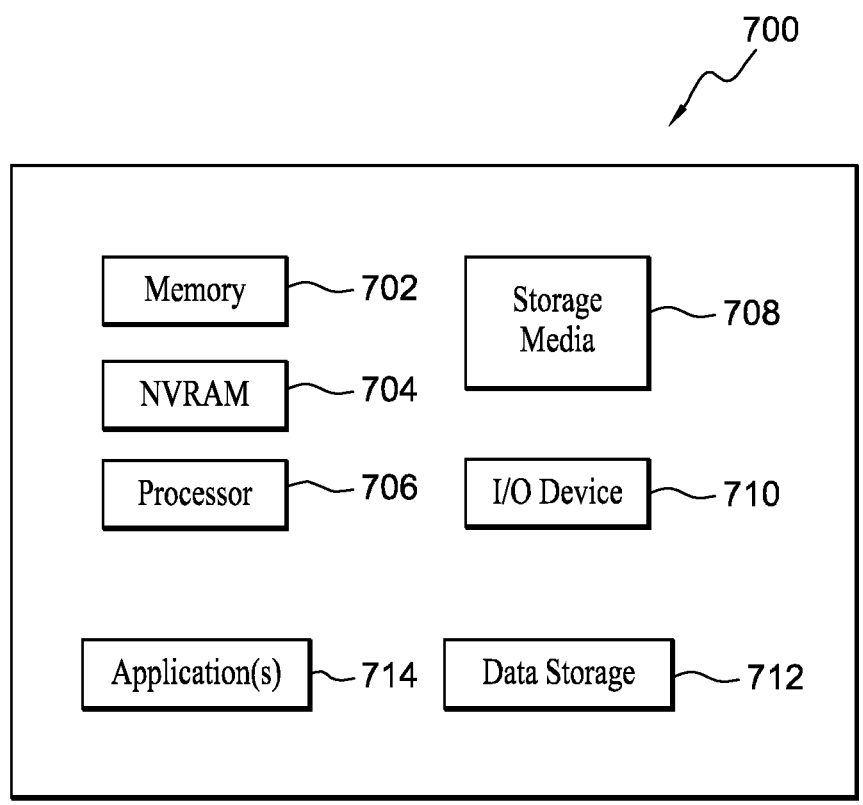
FIG. 3 discloses aspects of an example host configuration.

With reference briefly now to FIG. 3, any one or more of the clients 200 and its components, backup server 300, data center 400 and its components, data protection environment 500 and its components, production environment 602, clients 602a, validation environment 604, clients 604a, data protection environment 606, NTG recorder 608, and NTG player-validator 610 can take the form of a physical computing device, one example of which is denoted at 700. As well, where any of the aforementioned elements comprise or consist of a VM, that VM may constitute a virtualization of any combination of the physical components disclosed in FIG. 3.

In the example of FIG. 3, the physical computing device 700 includes a memory 702 which can include one, some, or all, of random access memory (RAM), non-volatile random access memory (NVRAM) 704, read-only memory (ROM), and persistent memory, one or more hardware processors 706, non-transitory storage media 708, I/O device 710, and data storage 712. One or more of the memory components 702 of the physical computing device can take the form of solid state device (SSD) storage. As well, one or more applications 714 are provided that comprise executable instructions. Such executable instructions can take various forms including, for example, a network traffic generator, and a network traffic player-validator.

D. Aspects of Some Example Validation Methods

Figure 4:
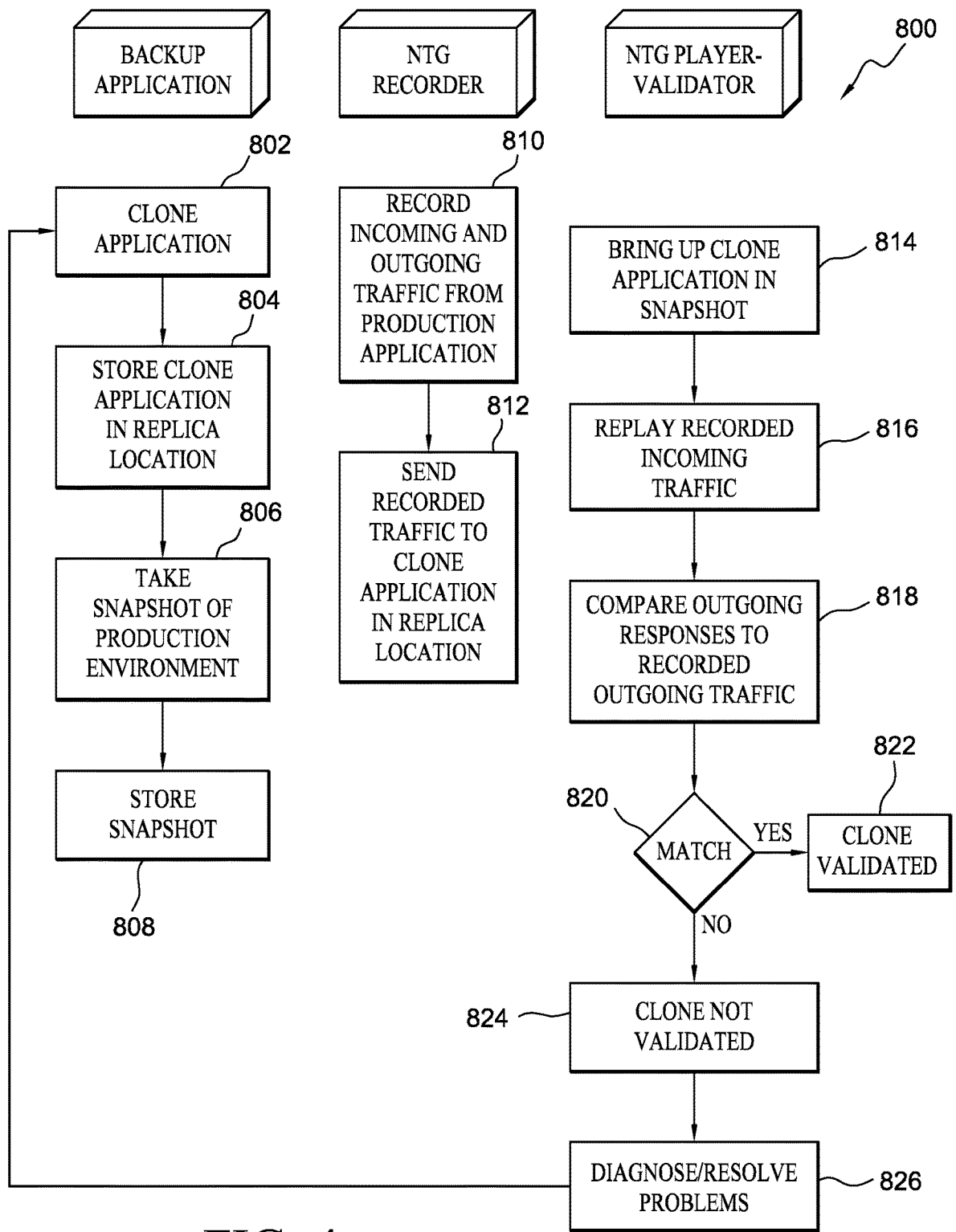
FIG. 4 discloses aspects of some example methods.

With reference now to FIG. 4, details are provided concerning a method, denoted generally at 800, for performing a validation process. Aspects of the method 800 may, for example, be performed by a backup application, an NTG recorder, and an NTG player-validator. However, the functions of method 800 may be allocated in any suitable way and, as such, the functional allocation disclosed in FIG. 4 is provided solely by way of example. Finally, it should be noted that while the various processes indicated in FIG. 4 are indicated as taking place in a particular order, and at relative times to other processes, the order and timing of the disclosed processes are presented only by way of example and are not intended to limit the scope of the invention in any way.

The method 800 can begin when a production application is protected 802, such as by cloning for example, with a data protection system that includes a backup application. In some embodiments, the clone may, for example, be an image of a production virtual machine (VM), that includes one or more applications, as that VM existed at a given point in time. In some embodiments, cloning of the production application can be performed continuously on an on-going basis. Alternatively, clones of the production application can be periodically created and the clones then transferred 804 to a replica location that is accessible by an NTG recorder and by an NTG player-validator. If desired, an older stored clone can be deleted when a newer clone is created.

Before, at the same time as, or after, the clone is created 802, the backup application may take 806 a snapshot of a production environment in which the application normally operates. The time at which the snapshot is taken may be designated time $T_{START}$. After the snapshot is taken 806, the snapshot can then be stored, such as in storage of a data protection environment. The snapshot, or clone, of the production environment may be performed in real-time, and may include one, some, or all, servers in a production environment, where each server is running one or more applications, including the production application.

Also at time $T_{START}$, the NTG recorder may begin to record 810 the incoming and outgoing traffic from the production application for a period of time "T." This recorded traffic is sent 812 to the replica location, that is, to the production environment snapshot where the clone application is deployed. The validation environment may be the replica location.

A validation portion of the method 800 may begin when the clone application is brought up 814, that is, instantiated, in the validation environment by the NTG player-validator. This clone application may constitute the production application in the state that the production application was in at time $T_{START}$. Next, the NTG player-validator may then replay 816 the incoming traffic to the production application that was previously recorded. That is, this incoming traffic may be transmitted to the clone application in the validation environment, and the response of the clone application observed and recorded.

The response, or outgoing traffic, of the clone application to the incoming traffic is then compared 820 to the previously recorded outgoing traffic of the production application. If the outgoing traffic of the clone application matches the outgoing traffic of the production application, or otherwise meets validation criteria, the clone application is then considered to be valid 822. On the other hand, if the comparison 820 reveals that the outgoing traffic of the clone application does not match the outgoing traffic of the production application, or otherwise fails to meet validation criteria, then the clone application is not validated 824.

When the clone application is not validated 824, a problem diagnosis and resolution process 826 may be performed. This process 826 may involve troubleshooting of the clone application and/or the production environment clone to identify and resolve any problems. Once troubleshooting and problem resolution are completed, the process may return to 802 where a new clone of the production application is created.

With continued reference to FIG. 4, details are provided concerning various aspects of the method 800 and aforementioned processes of that method 800. Reference is first made to the replay and compare logic employed by an NTG player-validator. Particularly, it is noted that, in some instances, replaying the recorded traffic at a later time exactly as recorded, and comparing the outputs verbatim may not be particularly effective for some real world applications. This is because traffic data may contain pieces of information which are randomly generated, timestamps, IP addresses and other domain-specific information depending on the application. Embodiments of the invention are able to accommodate such circumstances to provide useful output.

Thus, one example of a more general approach to replaying and comparing traffic involves the use of applications with RESTful API that enable Create, Read, Update, Delete (CRUD) operations. For example, some embodiments can automatically capture IDs of newly created resources using "Create" commands, which will typically appear in responses to HTTP POST requests. These IDs can be injected into following Read/Update/Delete commands, to achieve the same network traffic flow as the recorded network traffic flow. Following is an example flow of CRUD operations in an application that uses or includes a RESTful API, and illustrates a problem that may occur in some validation processes, but which may be resolved by embodiments of the invention.

Example flow of CRUD operations in a RESTful application:
1. Create resource of type Car by calling:
   a. Incoming: POST https://<webhost>/api/cars
   b. Outgoing: response containing car unique (random) ID XXX
2. Read info on Car XXX:
   a. Incoming: GET https://<webhost>/api/cars/XXX
   b. Outgoing: response containing info of car XXX
3. Update Car XXX:
   a. Incoming: PUT https://<webhost>/api/cars/XXX
   b. Outgoing: OK (car XXX updated)

Replaying and comparing the recorded incoming traffic in this example will result in comparison mismatches in 1.b. The reason is that the unique ID "XXX" was randomly generated in the first run, and the next time step 1 is executed on the replica application, a different unique and randomly generated ID, e.g. "YYY," will be returned.

However, embodiments of the invention enhance the network traffic "compare" functionality by identifying differences, such as the difference illustrated by the generation of XXX and YYY, automatically and allowing flexibility with some values, such as IDs, timestamps, etc., that are present in the network traffic. In more detail, such values can be identified by comparing traffic from the clone application with the recorded traffic of the production application and looking for specific commonly used patterns such as "ID:," "time:," or string patterns like Universally Unique Identifier UUIDs, and hex numbers, for example. They can also be determined by analyzing API type definitions like Web Application Description Language WADL or Web Services Description Language WSDL or analysis of DB schemas.

Thus, any such differences between traffic from the clone application and the recorded traffic will be classified as one of the allowed differences, such that the clone application can be declared valid, notwithstanding the existence of such differences, or such a difference may be declared as a mismatch such that the clone application can be declared not to be valid. In this way, a user or other administrator can establish the extent to which differences between the network traffic streams will affect a determination of validity or invalidity of the clone application.

To further illustrate, allowed or permissible differences between traffic from the clone application and the recorded traffic from the production application will be captured and used in subsequent replayed packets. For example, when replaying step 2.a (above), the "XXX" ID would be automatically replaced by the "YYY" captured in 1.b. The replaying implementation will maintain a translation table between production-generated IDs and those created on the replica test. In this way, embodiments of the invention are able to capture, acknowledge, and compensate for, certain differences between the traffic streams. Timestamps may be ignored in some instances at least.

As well, embodiments of the invention enable a user to fine tune the comparing and replaying algorithm, according to the specific application and feedback received from previous runs. For example, certain differences may be permissible in some network streams from one application, but not permissible in network streams from another application. This will help to reduce false positives in future comparisons and will also contribute to ongoing improvement of the replay and compare functionalities.

Circumstances may arise in which external conditions, that is, conditions in the production environment, may change between time that the traffic from the production application is recorded, and the time that the traffic from the clone application is generated. Such changes in conditions may cause differences in the respective replies, or outgoing traffic, generated by the production application and the clone application. This can occur when, for example, an application relies on a service external to the application itself which is available when the outgoing production application traffic is generated but not when the outgoing clone application traffic is generated. Applying knowledge about the application itself, such as the external services it uses, for example, can thus enable improvements in the success rate for the validation process, as well as reduce the amount of time and computing resources needed to perform the validation.

Embodiments of the invention may likewise be effective in dealing with situations in which replaying the traffic may introduce inefficiencies in terms of network uses and space. For example, it may be the case in some instances that transferring the recorded traffic from the production environment to the validation environment might be more time and/or resource-intensive than the replication of the application itself, which will render the solution impractical. As well, it can happen that the replay of the production traffic in the validation environment will sometimes be at a slower rate than the initial playing of the production traffic in the production environment. This may occur where, for example, the validation environment is not optimized and/or does not have the same resources as the production environment. In this case, a full replay in the validation environment may take longer than desired. As discussed below, various steps can be taken to avoid, or attenuate, this situation.

For example, the recording time for outgoing production application network traffic can be limited. One way to do this is to record the traffic from the production application for $t<T$ seconds bounded by time, or by a set number of requests or size. As well, it may be the case that replaying only "t" seconds of the production application traffic can be sufficient for validating that the clone application is working properly and that the cloning of the production application was successful.

For example, record only $t=1$ minute of traffic for every $T=1$ hour time span. The following procedure may be useful to determine a record time that will produce acceptable results:

Find the maximum proportion of traffic that can be transmitted to the other side due to bandwidth constraints (R1);

Calculate a factor of the performance of the production vs the replica (R2); and Take the lowest of the two ratios—$R=\min(R1,R2)$.

Now this holds: $\text{Max}(t)<T*R$

This approach can thus be used to find a good, and possibly optimal, record time. Following are some additional details, and an example of the implementation of this approach.

In the aforementioned relationship, R1 is defined as the maximum permissible bandwidth allowed to be consumed for the movement of network traffic. This R1 value could be calculated automatically according to up-to-date information on the current available bandwidth and the current amount of traffic generated by the application. As another example, the R1 value could be set by a user. For example R1 can be set to 1% of the total application traffic. The variable R2 is defined as the amount of production traffic, on a percentage basis, that is needed to be replayed in order to adequately test whether or not the clone application is valid. For example, R2 can be set to 0.7% of production traffic from an application. Next R1 and R2 can be compared with each other thus: R=min (R1, R2), or min (1%, 0.7%), where the smaller of the two ratios is=0.7%. Thus, the portion of the production application traffic you send should be less than or equal to 0.7%. For example, if the interval between snapshots, T, equals 1 hour or 3600 seconds, the recording time of the network traffic, t, would be 0.7% of 3660 seconds, or 25.62 seconds of every hour. This traffic will be able to be transferred using the available bandwidth and when replayed, should be adequate to test the clone application.

Still another way to compensate for a situation where the replay of the production traffic in the validation environment is at a slower rate than the initial playing of the production traffic in the production environment involves the use of filtering techniques. That is, the volume of recorded traffic can be reduced by creating and applying one or more filters to the traffic generated by the production application. For example, a filter can be created and applied that skips requests to the production application that include a payload bigger than size "s." Thus, any payloads of that size would not be returned as network traffic by the production application. Alternatively, a filter can be configured to skip "p" percent of requests to the production application that do not change the state of the service. In the case of a RESTful API, these are the GET requests. It will be appreciated that a procedure similar to that used for determining a record time can be used to find a good, and possibly optimal, filtering point.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   bringing up a clone application in a validation environment;
   replaying recorded incoming network traffic to the clone application;
   obtaining a response of the clone application to the incoming network traffic;
   comparing the response of the clone application to the incoming network traffic with recorded outgoing network traffic of a production application that was generated by the production application in response to receipt, by the production application, of the incoming network traffic;
   making a validation determination regarding the clone application, based on the comparison of the response of the clone application to the recorded outgoing network traffic of the production application, and the validation determination indicates whether or not, when the production application is restored to a particular point in time associated with the clone application, the production application will operate without any problems; and when the clone application is not validated, identifying and resolving a problem relating to the clone application.

2. The method as recited in claim 1, wherein the clone application is created by applying a cloning process to the production application.

3. The method as recited in claim 1, wherein the validation environment comprises a clone of a production environment in which the production application operates.

4. The method as recited in claim 1, wherein the recorded incoming network traffic was generated by recording incoming network traffic to the production application.

5. The method as recited in claim 1, wherein part of the method is performed by a network traffic generator player-validator.

6. The method as recited in claim 1, wherein the recorded incoming network traffic to the clone application is replayed in the validation environment.

7. The method as recited in claim 1, wherein the recorded incoming network traffic to the clone application spans a time period "T" and comprises less than all of the incoming network traffic received by the production application during the time period "T".

8. The method as recited in claim 1, wherein the clone application is validated notwithstanding one or more differences between the response of the clone application and the recorded outgoing network traffic of the production application.

9. The method as recited in claim 1, wherein evaluation of the clone application is performed automatically and/or on an ongoing basis.

10. The method as recited in claim 1, wherein a volume of the recorded incoming network traffic is a function of one or both of (i) a permissible bandwidth allowed to be consumed for the movement of network traffic, and (ii) an amount of production traffic that is needed to be replayed in order to adequately test whether or not the clone application is valid.

11. A non-transitory storage medium having stored therein computer-executable instructions which, when executed by one or more hardware processors, perform the following operations:

bringing up a clone application in a validation environment;

replaying recorded incoming network traffic to the clone application;

obtaining a response of the clone application to the incoming network traffic;

comparing the response of the clone application to the incoming network traffic with recorded outgoing network traffic of a production application that was generated by the production application in response to receipt, by the production application, of the incoming network traffic;

making a validation determination regarding the clone application, based on the comparison of the response of the clone application to the recorded outgoing network traffic of the production application, and the validation determination indicates whether or not, when the production application is restored to a particular point in time associated with the clone application, the production application will operate without any problems; and when the clone application is not validated, identifying and resolving a problem relating to the clone application.

12. The non-transitory storage medium as recited in claim 11, wherein the clone application is created by applying a cloning process to the production application.

13. The non-transitory storage medium as recited in claim 11, wherein the validation environment comprises a clone of a production environment in which the production application operates.

14. The non-transitory storage medium as recited in claim 11, wherein the recorded incoming network traffic was generated by recording incoming network traffic to the production application.

15. The non-transitory storage medium as recited in claim 11, wherein part of the method is performed by a network traffic generator player-validator.

16. The non-transitory storage medium as recited in claim 11, wherein the recorded incoming network traffic to the clone application is replayed in the validation environment.

17. The non-transitory storage medium as recited in claim 11, wherein the recorded incoming network traffic to the clone application spans a time period "T" and comprises less than all of the incoming network traffic received by the production application during the time period "T".

18. The non-transitory storage medium as recited in claim 11, wherein the clone application is validated notwithstanding one or more differences between the response of the clone application and the recorded outgoing network traffic of the production application.

19. The non-transitory storage medium as recited in claim 11, wherein evaluation of the clone application is performed automatically and/or on an ongoing basis.

20. The non-transitory storage medium as recited in claim 11, wherein a volume of the recorded incoming network traffic is a function of one or both of (i) a permissible bandwidth allowed to be consumed for the movement of network traffic, and (ii) an amount of production traffic that is needed to be replayed in order to adequately test whether or not the clone application is valid.

* * * * *